United States Patent [19]

Hron, Sr. et al.

[11] Patent Number: 5,112,637

[45] Date of Patent: May 12, 1992

[54] EXTRACTION OF GOSSYPOL FROM COTTONSEED

[75] Inventors: Robert J. Hron, Sr., New Orleans; George Abraham, Metairie; Myong S. Kuk, Metairie; Gordon S. Fisher, Metairie, all of La.

[73] Assignee: The United States of America as represented by the Secretary of Agriculture, Washington, D.C.

[21] Appl. No.: 608,786

[22] Filed: Nov. 5, 1990

[51] Int. Cl.$^5$ ............................................. A23B 9/16
[52] U.S. Cl. ................................. 426/629; 426/331; 426/430; 426/486; 554/11; 554/13
[58] Field of Search ............... 426/486, 629, 656, 622, 426/430, 331; 260/412.4

[56] References Cited

U.S. PATENT DOCUMENTS

| | | | |
|---|---|---|---|
| 2,615,808 | 10/1952 | Rice | 260/412.4 |
| 2,950,198 | 8/1960 | King et al. | 426/417 |
| 3,062,876 | 11/1962 | Pons et al. | 260/520 |
| 3,432,529 | 3/1969 | Depmer | 260/412.4 |
| 3,557,168 | 1/1971 | Don, Jr. et al. | 260/412 |
| 3,615,657 | 10/1971 | Gastrock | 426/486 |
| 3,941,764 | 3/1976 | Hensarling | 426/656 |
| 3,972,861 | 8/1976 | Gardner | 426/656 |
| 4,072,671 | 2/1978 | Sodini | 426/634 |
| 4,084,007 | 4/1978 | Hipp | 426/430 |
| 4,139,646 | 2/1979 | Gastrock | 426/430 |
| 4,148,928 | 4/1979 | Sodini et al. | 426/430 |
| 4,201,709 | 5/1980 | Kadan | 426/430 |
| 4,219,469 | 8/1980 | Kadan et al. | 260/123.5 |
| 4,359,417 | 11/1982 | Karnofsky et al. | 260/1235 |
| 4,546,004 | 10/1985 | Rhee | 426/629 |
| 4,747,979 | 5/1988 | Gimber | 260/412.4 |

OTHER PUBLICATIONS

Canella et al, Journ. of Food Science, 42:1218–1219, 1977.
Abov-Donia et al, "High-Performance Liquid . . . ", Journal of Chrom. 206 (1981) 606–610.
English Language abstract of German Offen 2,606,961, 9 Sep. 1976.
English Language abstract of Spanish patent 445,653, 01 Jun. 1977.
Abstract of: M. Canella et al, "Functional Properties . . . " Riv. Ital. Sostanze Grasse 1977, 54(2), 73–6.
Abstract of: G. Sodini et al, "Effect of . . . " Riv. Sci Technol. Alimenti Nutr. UM 1976, 6(4), 219–21.
Abstract of German Offen 2,631,695, 26 Jan. 1977.

*Primary Examiner*—Carolyn Paden
*Attorney, Agent, or Firm*—David R. Sadowski; M. Howard Silverstein

[57] ABSTRACT

The present invention is drawn to a process for extraction of gossypol for cottonseed using a solvent solution which includes: (a) a water miscible organic solvent; (b) water; and (c) an acid which is strong enough to prevent binding of gossypol to cottonseed protein but which is not so strong as to hydrolyze a substantial portion of the cottonseed protein. The present invention also includes cotton seed meals of reduced gossypol content (and optionally reduced aflatoxin and/or fat content) produced by the aforementioned extraction.

26 Claims, No Drawings

EXTRACTION OF GOSSYPOL FROM COTTONSEED

FIELD OF THE INVENTION

This invention relates to a solvent extraction process for removing gossypol (a toxic pigment) from cottonseed. The extraction is conducted with a solvent solution comprised of: a water miscible organic solvent, water and an acid which is strong enough to prevent gossypol from binding to cottonseed protein, but not so strong that it hydrolyses a substantial amount of the cottonseed protein.

BACKGROUND OF THE INVENTION

Unlike other commercial oilseeds, cottonseed contains a toxic pigment, gossypol, which prevents it from being a feed for animals, other than those that have a rumen. That is, while some whole cottonseed is fed to mature ruminants, most of it is separated into oil and meal, typically by solvent extraction using hexane. As used herein, cottonseed meal, or flour, refers to the whole residue remaining after most of the oil has been removed. Before the oil and meal can be used as a food source, the gossypol must be removed or deactivated. In addition, unfavorable growing, harvesting, or storage conditions can cause cottonseed to mold and become contaminated with a mold metabolite aflatoxin, which, because it is carcinogenic, must be removed, or destroyed. The presence of such toxic components prevents cottonseed from reaching its full potential as a food source, especially in countries that grow cotton but not soybeans. In the intact cottonseed, the gossypol is concentrated in glands that are covered with a hydrophilic coating, which keeps the gossypol from coming into contact with other components of the seed. Originally, gossypol was deactivated by pressing, or expelling, the oil out of moist seeds at relatively high temperatures, such as at temperatures from about 110° to 130° C. Under these conditions, the glands are ruptured by hot moisture, releasing gossypol. Most of the gossypol reacts with protein, thereby forming bound gossypol, which is insoluble. The rest reacts with phospholipids and other low molecular weight components of the seed to give products that are soluble in oil and other organic solvents, as is any unreacted gossypol. The gossypol in these soluble products is referred to as free gossypol. Total gossypol is the sum of bound gossypol and free gossypol. Total gossypol content of meals made by such a process are typically from about 0.7 to 1.0 wt. %. While binding to protein is advantageous in that it acts to detoxify the gossypol, it is disadvantageous because it reduces the nutritive value of the meal by reducing the available lysine content.

Currently, separation is done by expression, or by extraction of the oil from flaked kernels at elevated temperatures with a solvent such as hexane, or a combination of expression and extraction. The most common method used today is solvent extraction, but unless a separate moist heating preconditioning step is included, meals produced by this method will contain unruptured glands and excessive amounts of free gossypol. Furthermore, it is well known that adverse physiological effects can occur with some meals containing high total gossypol, even though free gossypol is within acceptable limits.

Hence, it has long been recognized that a process is needed that could reduce the total gossypol of cottonseed meal by removing gossypol instead of binding it to protein. Various processes have been developed in an attempt to accomplish this. For example, multistep processes in which both the oil and gossypol are extracted with different solvents, in different steps, are known. For example, U.S. Pat. No. 4,359,417, teaches a two step process comprising first extracting cottonseed flakes with an 85% aqueous ethanol solution at about 110° F., which removes some of the gossypol with the remainder becoming bound to the meal. This is followed by a second extraction but with a 95% ethanol solution at 175° F., which removes the oil. Although such a process has merit, it can do no better than produce a meal which still contains from 0.29 to 0.45 wt. % total gossypol and 0.019 to 0.045 wt. % free gossypol.

Another reference, Canella and Sodini (Journal of Food Science, 42:1218-1219 (1977)), discloses a method wherein hexane extraction of raw cottonseed at 25° C. is used to produce a cottonseed meal, followed by room temperature extraction with n-butanol containing HCl at carefully controlled pH of about 4.5, in order to obtain a product which contains 0.34 wt. % total and 0.07 wt. % free gossypol. One disadvantage of such a process is that the high boiling point of n-butanol makes its removal from the meal difficult. Further, the one-solvent processes that have been described in the art generally use mixed solvent systems which are not suitable for food use. For example, U.S. Pat. No. 3,557,168 teaches the use of a hexane-acetone mixture and U.S. Pat. No. 2,950,198 (King et al, 8/1960) teaches the use of a hexane-acetone-water mixture. Both of these processes leave residues which produce a strong objectionable catty odor in the meal, thus making them unsuitable for food use. Further, U.S. Pat. No. 4,747,979 teaches the use of a chlorinated hydrocarbon as one component of their mixed solvent, which of course is also unsuitable for food use.

Although other separation processes, such as the liquid cyclone process taught in U.S. Pat. No. 3,615,657 can yield solid products containing less than about 0.3 wt. % total gossypol from glanded seed, such low gossypol fractions account for only about 50% of the total meal. The remaining fraction contains relatively high total gossypol concentrations.

Also, U.S. Pat. No. 4,219,469, teaches the use of a solvent solution comprised of: a non-polar solvent, such as hexane; a polar solvent, such as ethanol; and a food grade acid, such as citric acid; to obtain protein isolates from cottonseed. The isolates are improved because of their improved coloration. Gossypol is not significantly removed by the process of this reference.

Furthermore, in conventional processes for producing cottonseed meal, a small amount of the gossypol which is present in the seed, is bound to phospholipids and extracted with the oil. This is in contrast to the major portion which is bound to protein and remains in the meal. Another patent, U.S. Pat. No. 3,062,876 discloses that the soluble bound gossypol can be dissolved in methyethylketone (MEK) and hydrolyzed in the presence of phosphoric acid. It is stressed that MEK be used because the bound gossypol must be soluble in the acidic solution used for hydrolysis.

The potential use of gossypol as a male contraceptive is an added incentive for the need for a process that can separate unmodified gossypol from both cottonseed oil and meal, instead of binding it to the meal. Consequently, there still exists a need in the art for more effective processes for removing gossypol, as well as other non food grade components from cottonseed.

SUMMARY OF THE INVENTION

In accordance with the present invention, there is provided a process for the extraction of gossypol from cottonseed, which process comprises:

(a) contacting cottonseed with a solvent solution comprised of: (i) a water miscible organic solvent; (ii) water; and (iii) an acid which is characterized as being strong enough to prevent binding of the gossypol to the cottonseed protein, but not so strong that it will hydrolyze a substantial portion of the cottonseed protein; under conditions providing extraction of gossypol from said cottonseed by said solvent solution, thereby producing cottonseed meal of reduced gossypol content and solvent solution having gossypol therein; and (b) separating said cottonseed meal of reduced gossypol content from said solvent solution having gossypol therein.

In a preferred embodiment of the present invention, the water miscible solvent is selected from the water miscible alcohols, esters, ethers, nitriles and mixtures thereof, and is present in a weight ratio of solvent solution to cottonseed of from about 12 to 1 to about 1 to 1, and the cottonseed is in the form of kernels, flakes or a meal.

In other preferred embodiments of the present invention, the acid present is such that it is able to provide the solvent solution with a pH of from about 2 to about 5.

In yet other preferred embodiments of the present invention, the solvent solution is comprised of about 2 to 12 wt. % water and from about 75 to 95 wt. % solvent and the extraction is conducted at a temperature from about 50° C. up to, but not including, the boiling point of the solvent.

In still further preferred embodiments of the present invention, the water miscible solvent is selected from the group consisting of the $C_1$ to $C_3$ monohydric alcohols and the acid is selected from the tribasic acids: citric acid, ascorbic acid, phosphoric acid, and mixtures thereof.

The present invention also includes cottonseed meals of reduced gossypol content (and optionally reduced aflatoxin and/or fat content) produced by the processes of the instant invention. Other aspects, objects and advantages of the present invention will become readily apparent from the ensuing description.

DESCRIPTION OF THE PREFERRED EMBODIMENTS

In general, the solvent solution of the present invention contains: a water miscible organic solvent, the aforementioned acid, and water. The water content of the combination of both the cottonseed and the solvent solution should range from about 2 to 32 wt. %, preferably from about 2 to 14 wt. %, and more preferably from about 4 to 12 wt. %. The amount of water required in the solvent solution will be affected by the water already present in the cottonseed. After preparation for extraction, the cottonseed kernels, flakes, or full fat meal, usually contains from about 2 to 14 wt. % water. Preferably, the weight percent of water in the solvent should be at least 12 wt. % minus the wt. % of water in the cottonseed product. The upper limit of water concentration is set by the minimum functional concentration of the other two components, the solvent and the acid, which will be discussed in detail below.

In order to inhibit binding of gossypol without significant hydrolysis of protein, the pH of the solvent solution should be from about 2 to about 5, preferably from about 2 to about 4, and more preferably from about 2 to about 3. Depending on the equivalent weight and pK (negative logarithm of the first dissociation constant of the acid) the effective amount of acid will usually range from about 1 to 20 wt. % acid, preferably from about 2 to 10 wt. % acid. Preferred acids are those having equivalent weights of less than about 80 and a pK of from about 2 to about 4.2. Acetic acid, which has a pK of 4.75, is unsuitable for use herein. Nonlimiting examples of preferred acids, are both organic and inorganic (e.g. tribasic inorganic or organic acids) and include phosphoric, citric, and ascorbic acids, and mixtures thereof. More preferred are phosphoric (eq.wt.=33, pK=2.1) and citric (eq.wt. =64, pK =3.1) acids, which at concentrations of 0.1 to 0.4 molar give pHs from about 3.2 to 2.3. Most preferred are food grades of these acids, so that residual acid in the cottonseed meal or flakes would not preclude approval for food use.

Non-limiting examples of water miscible organic solvents usable in the present invention include: alcohols, esters, ethers, nitriles, and mixtures thereof. Preferred are the water miscible organic solvents. More preferred are the $C_1$ to $C_3$ monohydric alcohols, most preferably are those that are suitable for use in food processing, such as ethanol, which is non-toxic, has favorable oil- and acid-solubility, is easy to recover for recycling, and is a standard article of commerce. Maximum concentration of organic solvent in the solvent solution is determined by subtracting the required water and acid concentrations from 100 wt. %, i.e. about 99 wt. % for extraction of cottonseed containing more than 12 wt. % water using the minimum amount of acid. The minimum concentration will depend on the specific organic solvent and is determined by the requirement that both oil and gossypol be soluble in the solvent solution. The minimum will be highest for low extraction temperatures and lowest for extractions carried out under pressure at temperatures above the normal boiling point of the solvent. In general, the solvent solution will contain about 70 to about 98 wt. % organic solvent, preferably about 75 to about 95 wt. %, more preferably about 80 to about 90 wt. %. Most preferred is about 83 to about 92 wt. % ethanol, which corresponds to use of commercial 95 vol. % ethanol to prepare 0.1 to 0.4 molar solutions of citric and phosphoric acid.

The present invention can be practiced in a variety of ways. For example, the extraction can be performed in a batch mode. As in any extraction process, a single equilibration of the cottonseed flakes with the solvent, followed by separation of the two phases, yields a miscella containing extracted oil and gossypol, and a marc consisting of residual flakes saturated with absorbed miscella. In order to remove all of the oil and gossypol, the equilibrium process must be repeated several times with fresh solvent. The number of cycles required will be dependent on such things as the strength of the solvent, the solvent to flakes ratios, the temperature and pressure conditions, and the desired degree of oil and gossypol removal. In general, for maximum removal, from about 5 to 10 cycles may be required using the most preferred solvents at about 78° C. and atmospheric pressure, with about a 3 to 1 wt. ratio of solvent to flakes in the first cycle, and a 2 to 1 wt. ratio in subsequent cycles.

In general, the process of the present invention may be carried out over a wide range of temperatures. This range will generally be from about 50° C. up to about 90° C. It is also understood that the extraction can also be run at elevated temperatures and pressures, preferably up to those pressures which can be safely practiced with the type of equipment used in commercial cottonseed extraction. This pressure can be up to about 60 psig at temperatures up to about 130° C, more preferably from about 3 to about 10 psig, at temperatures of from about 70° C to about 90° C, preferably from about 80° C to about 90° C The present invention can also be practiced in a continuous process wherein the solvent solution is preferably run countercurrent to the cottonseed and the residence time of the cottonseed, in contact with fresh solvent, will determine the extent of oil and gossypol removal. Such determinations of residence times etc. are within the ordinary skill of those in the art, given the teachings herein, and need not be discussed further. It is preferred to rinse the cottonseed meal of reduced gossypol content (after the step of contacting) With fresh solvent, which may be similar to that used in the extraction but without added acid in order to recover acid absorbed by the cottonseed. Thus, the fresh solvent may include a water miscible organic solvent selected from the group consisting of alcohols, esters, ethers, nitriles and mixtures thereof.

The term cottonseed, as used herein, is meant to include cottonseed in any form. That is, the present invention can be practiced on cottonseed in any form (e.g. kernels, flakes, meal, full fat, wholly defatted prior to the step of contacting, partially defatted prior to the step of contacting, etc.), although it is preferred not to us whole seed because of the difficulty of achieving an effective extraction. Also, ground kernels present a problem of fines which makes separation of the meal from miscella difficult.

The foregoing detailed description is given merely for purposes of illustration. Modifications and variations may be made therein without departing from the spirit and scope of the invention.

The following examples are presented for illustrative purposes only and are not to be taken as limiting the scope of the claims hereof.

EXAMPLE 1

Full-fat cottonseed meals, containing 8% moisture, were flaked using conventional flaking rolls set at 0.008 inches. A 300 gram (g) portion of the flakes and a 95 vol. % ethanol solution (800g) were placed in a jacketed, stainless steel, cylindrical extractor (6" diam.×6" deep) fitted with a 12 mesh stainless steel retaining screen at the bottom. Hot (79° C) water was circulated through the jacket. Solvent was recirculated through the flakes at a rate of 1 liter (L)/min for 10 min. Miscella (ca 300 g) was drained from the extractor and the flakes were reextracted under the same conditions using 600 g portions of solvent solution. After the seventh extraction, each extraction being about 10 min in duration, the spent flakes were washed with 650 g of 95 vol. % ethanol to remove acid absorbed by the meal. Spent flakes were allowed to air dry at room temperature (ca 25° C) over night and then oven dried at 1010C for one hour. They were then ground with a Wiley mill to pass a 20 mesh screen, analyzed for residual lipids, total gossypol, and free gossypol. The solvent solutions were comprised of 0.1 and 0.4M citric acid, prepared using anhydrous citric acid, and 0.1 and 0.34M phosphoric acid, prepared using 85 wt. % orthophosphoric acid, all in 95 vol. % ethanol. For comparison, an extraction of the same lot of flakes was made using 95 vol. % ethanol without tribasic acid. The results are shown in Table I below for full fat flakes which initially contained 26.3 wt. % lipids, 8 wt. % moisture, 1.08 wt. % total gossypol and 1.06 wt. % free gossypol.

TABLE I

| SOLVENT | wt. % RESIDUAL LIPIDS | wt. % TOTAL GOSSYPOL* | wt. % FREE GOSSYPOL* |
|---|---|---|---|
| No acid | 0.75 | 1.08 | 0.08 |
| 0.1M citric | 1.1 | 0.40 | 0.02 |
| 0.4M citric | 1.1 | 0.09 | 0.007 |
| 0.1M phosphoric | 0.5 | 0.27 | 0.02 |
| 0.34M phosphoric | 1.4 | 0.03 | 0.005 |

*Moisture- and oil-free basis.
Conventional hexane extraction left 1.46 wt. % total gossypol, of which 0.56 wt. % was free gossypol, in the meal.

This example shows that the present invention provides a u very substantial reduction in the concentration of total gossypol and free gossypol, as compared to extraction with ethanol alone or extraction with hexane.

EXAMPLE 2

As shown in the following Table II below, when cottonseed containing aflatoxin, chiefly aflatoxin B1, is processed as described in Example 1 hereinabove, aflatoxin, as well as gossypol, are removed from the meal.

TABLE II

| SOLVENT | wt. % RESIDUAL LIPIDS | ppb B1 AFLATOXIN* | wt. % TOTAL GOSSYPOL* | wt. % FREE GOSSYPOL* |
|---|---|---|---|---|
| None** | 26.2 | 69 | 1.00 | 0.91 |
| No Acid | 0.94 | 3.6 | 0.80 | 0.01 |
| 0.1M citric | 0.87 | 3.8 | 0.22 | 0.01 |
| 0.4M citric | 2.3 | 3.4 | 0.09 | 0.06 |
| 0.1M phosphoric | 1.1 | 3.7 | 0.08 | 0.01 |
| 0.34M phosphoric | 5.1 | 2.9 | 0.05 | 0.004 |

*Moisture- and oil-free basis.
**Unprocessed full-fat flakes; as is basis.

Conventional hexane extraction left 37.5 ppb aflatoxin, 1.24% total-, and 0.84% free- gossypol, all moisture- and oil-free basis by weight, in the meal.

EXAMPLE 3

The process of the instant invention is intended primarily for use on full-fat flakes that contain very little bound gossypol (total minus free); however, as illustrated in this example a significant reduction in total gossypol content of partially defatted or fully defatted meals and other products containing large amounts of bound gossypol can be achieved by extraction with solvents described herein.

A 300 g sample of cottonseed flakes, similar to those used in Example 1, were extracted with 95 vol. % ethanol in a Soxhlet apparatus for 4 hours, which removed most of the oil and converted most of the gossypol from free to bound form. The resulting defatted meal, which contained 6.5 wt. % residual lipids, 1.40 wt. % total gossypol and 0.02 wt. % free gossypol, was extracted three times using 800, 600, and 600 g of acidified 95 vol. % ethanol as indicated in Table III below. Each extraction was at 78° C. for 20 min.

TABLE III

|  | wt. % RESIDUAL LIPIDS* | wt. % TOTAL GOSSYPOL* | wt. % FREE GOSSYPOL* |
|---|---|---|---|
| Starting Material (i.e. defatted meal) | 6.5 | 1.40 | 0.02 |
| 0.4M citric acid in 95 vol. % ethanol | 0.29 | 0.88 | 0.12 |
| 0.34M phosphoric acid in 95 vol. % ethanol | 0.13 | 0.52 | 0.09 |

*Moisture- and oil-free basis.

What is claimed is:

1. A process for extraction of gossypol from cottonseed, which process comprises:
   (a) contacting cottonseed with a solvent solution comprised of: (i) a water miscible organic solvent; (ii) water, and; (iii) an acid which is characterized as being strong enough to prevent binding of gossypol to cottonseed protein, but not so strong that it will hydrolyze a substantial portion of said cottonseed protein; under conditions providing extraction of gossypol from said cottonseed by said solvent solution, thereby producing cottonseed meal of reduced gossypol content and solvent solution having gossypol therein; and
   (b) separating said cottonseed meal of reduced gossypol content from said solvent solution having gossypol therein.

2. The process of claim 1 wherein said water miscible organic solvent is selected from the group consisting of alcohols, esters, ethers, nitriles and mixtures thereof.

3. The process of claim 2 wherein said water miscible solvent is a $C_1$ to $C_3$ monohydric alcohol.

4. The process of claim 3 wherein said water miscible alcohol is ethanol.

5. The process of claim 3 wherein said step of contacting is carried out with a weight ratio of solvent solution to cottonseed of from about 15 to 1 to about 1 to 1.

6. The process of claim 1 wherein said cottonseed meal of reduced gossypol content is rinsed with fresh solvent after said step of contacting.

7. The process of claim 6 wherein said fresh solvent includes a water miscible organic solvent selected from the group consisting of alcohols, esters, ethers, nitriles and mixtures thereof.

8. The process of claim 1 wherein said solvent solution has a pH of from about 2 to about 5.

9. The process of claim 8 wherein said solvent solution has a pH of from about 2 to about 4.

10. The process of claim 1 wherein said acid is a tribasic inorganic or organic acid.

11. The process of claim 10 wherein said acid is selected from the group consisting of citric acid, ascorbic acid, phosphoric acid, and mixtures thereof.

12. The process of claim 1 wherein said step of contacting is carried out with a weight ratio of solvent solution to cottonseed of from about 1 to 1 to about 1 to 1.

13. The process of claim 1 wherein said cottonseed and said solvent solution, contain a total of from about 2 to about 32 wt. % water.

14. The process of claim 13 wherein said cottonseed and said solvent solution, contain a total of from about 4 to about 12 wt. % water.

15. A cottonseed meal of reduced gossypol content produced by the process of claim 13.

16. The process of claim 1 wherein said step of contacting is carried out at a temperature from about 50° C. to about 90° C.

17. The process of claim 1 which is practiced at pressures up to about 60 psig and temperatures up to about 130° C.

18. The process of claim 1 which is practices at pressures of about 3 to about 10 psig and temperatures from about 80° C. to about 90° C.

19. A cottonseed meal of reduced gossypol content produced by the process of claim 18.

20. The process of claim 1 wherein said step of contacting removes aflatoxins from said cottonseed.

21. A cottonseed meal of reduced gossypol and reduced aflatoxin content produced by the process of claim 20.

22. The process of claim 1 wherein said cottonseed is full fat, and said step of contacting extracts fat from said cottonseed.

23. A cottonseed meal of reduced gossypol and reduced fat content produced by the process of claim 22.

24. The process of claim 1 wherein said cottonseed is wholly or partially defatted prior to said step of contacting.

25. A cottonseed meal of reduced gossypol content produced by the process of claim 1.

26. A cottonseed meal of reduced gossypol, aflatoxin and fat content produced by the process of claim 1.

* * * * *